United States Patent
Schell

(10) Patent No.: US 7,479,925 B2
(45) Date of Patent: Jan. 20, 2009

(54) AIRPORT RUNWAY COLLISION AVOIDANCE SYSTEM AND METHOD

(75) Inventor: Ethan T. Schell, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 198 days.

(21) Appl. No.: 10/907,172

(22) Filed: Mar. 23, 2005

(65) Prior Publication Data

US 2006/0214816 A1 Sep. 28, 2006

(51) Int. Cl.
G01S 3/02 (2006.01)
G01S 13/00 (2006.01)
G06F 17/10 (2006.01)

(52) U.S. Cl. .................... 342/455; 342/30; 701/301

(58) Field of Classification Search ............... 342/455, 342/30; 701/301, 16; 340/961, 970
See application file for complete search history.

(56) References Cited

U.S. PATENT DOCUMENTS

| | | | | |
|---|---|---|---|---|
| 3,808,598 A * | 4/1974 | Carter | ...................... | 342/456 |
| 4,128,839 A * | 12/1978 | McComas | ................... | 342/32 |
| 4,454,510 A * | 6/1984 | Crow | ........................ | 342/32 |
| 5,208,591 A * | 5/1993 | Ybarra et al. | ............... | 340/961 |
| 5,216,611 A * | 6/1993 | McElreath | ................. | 701/221 |
| 5,268,698 A * | 12/1993 | Smith et al. | ................. | 342/450 |
| 5,289,185 A * | 2/1994 | Ramier et al. | .............. | 340/971 |
| 5,325,302 A * | 6/1994 | Izidon et al. | ................ | 701/301 |
| 5,450,329 A * | 9/1995 | Tanner | ....................... | 701/213 |
| 5,506,587 A * | 4/1996 | Lans | ..................... | 342/357.09 |
| 5,519,618 A * | 5/1996 | Kastner et al. | ............. | 701/120 |
| 5,530,440 A * | 6/1996 | Danzer et al. | .............. | 340/933 |
| 5,548,515 A * | 8/1996 | Pilley et al. | ................ | 701/120 |
| 5,574,649 A * | 11/1996 | Levy | ......................... | 701/207 |
| 5,596,332 A * | 1/1997 | Coles et al. | ................. | 342/455 |
| 5,627,546 A * | 5/1997 | Crow | ........................ | 342/352 |
| 5,714,948 A * | 2/1998 | Farmakis et al. | ........... | 340/961 |
| 5,892,462 A * | 4/1999 | Tran | .......................... | 340/961 |
| 6,038,502 A * | 3/2000 | Sudo | .......................... | 701/23 |
| 6,076,042 A * | 6/2000 | Tognazzini | ................ | 701/301 |
| 6,182,005 B1 * | 1/2001 | Pilley et al. | ................. | 701/120 |
| 6,219,592 B1 * | 4/2001 | Muller et al. | ................. | 701/9 |
| 6,219,618 B1 * | 4/2001 | Bateman | .................... | 701/301 |
| 6,314,366 B1 * | 11/2001 | Farmakis et al. | ........... | 701/201 |
| 6,347,263 B1 * | 2/2002 | Johnson et al. | .............. | 701/14 |

(Continued)

OTHER PUBLICATIONS

Rick Cassell, et al.; Pathprox—A Runway Incursion Alerting System; AIAA 19th Annual Digital Avionics Systems Conference; Alexandria, VA; IEEE 2000; pp. 1-6.

(Continued)

Primary Examiner—Thomas H Tarcza
Assistant Examiner—Harry Liu
(74) Attorney, Agent, or Firm—Black Lowe & Graham PLLC

(57) ABSTRACT

Systems and methods for avoiding runway collisions. In a disclosed embodiment of the invention, a collision avoidance system includes a position-sensing device that is operable to determine a position of the aircraft, and a communications system operable to support two-way communications between the aircraft and other similarly configured aircraft. A collision avoidance processor is coupled to the position-sensing device and the communications system that is configured to generate a message if the aircraft moves into a restricted zone positioned proximate to the airport.

20 Claims, 3 Drawing Sheets

U.S. PATENT DOCUMENTS

| | | | |
|---|---|---|---|
| 6,353,734 B1* | 3/2002 | Wright et al. | 455/98 |
| 6,370,475 B1* | 4/2002 | Breed et al. | 701/301 |
| 6,381,541 B1* | 4/2002 | Sadler | 701/301 |
| 6,405,975 B1* | 6/2002 | Sankrithi et al. | 244/1 R |
| 6,438,491 B1* | 8/2002 | Farmer | 701/301 |
| 6,453,231 B1* | 9/2002 | Ooga | 701/120 |
| 6,462,697 B1* | 10/2002 | Klamer et al. | 342/36 |
| 6,694,249 B1* | 2/2004 | Anderson et al. | 701/120 |
| 6,748,325 B1* | 6/2004 | Fujisaki | 701/301 |
| 6,980,892 B1* | 12/2005 | Chen et al. | 701/9 |
| 6,983,206 B2 | 1/2006 | Conner et al. | |
| 7,117,089 B2* | 10/2006 | Khatwa et al. | 701/301 |
| 7,126,534 B2* | 10/2006 | Smith et al. | 342/456 |
| 2001/0013836 A1* | 8/2001 | Cowie | 340/961 |
| 2002/0109625 A1* | 8/2002 | Gouvary | 342/29 |
| 2002/0116127 A1* | 8/2002 | Sadler | 701/301 |
| 2002/0154061 A1* | 10/2002 | Frazier et al. | 342/455 |
| 2003/0016159 A1* | 1/2003 | Stayton et al. | 342/30 |
| 2003/0033084 A1* | 2/2003 | Corcoran, III | 701/301 |
| 2003/0122701 A1* | 7/2003 | Tran | 342/29 |
| 2003/0135327 A1* | 7/2003 | Levine et al. | 701/220 |
| 2003/0137444 A1* | 7/2003 | Stone et al. | 342/30 |
| 2004/0030465 A1* | 2/2004 | Conner et al. | 701/16 |
| 2004/0215372 A1* | 10/2004 | Bateman et al. | 701/1 |
| 2005/0015202 A1 | 1/2005 | Poe et al. | |
| 2005/0190079 A1* | 9/2005 | He | 340/945 |
| 2005/0192739 A1* | 9/2005 | Conner et al. | 701/120 |
| 2005/0283281 A1* | 12/2005 | Hartmann et al. | 701/4 |
| 2006/0167598 A1* | 7/2006 | Pennarola | 701/11 |
| 2006/0265109 A1* | 11/2006 | Canu-Chiesa et al. | 701/3 |

OTHER PUBLICATIONS

Denise R. Jones, et al.; Runway Incursion Prevention System—Demonstration and Testing at the Dallas/Fort Worth International Airport; 20th Annual Digital Avionics Systems Conference; Hampton, VA; pp. 1-11.

Dr. Jens Schiefele, et al., World-Wide Precision Airport Mapping Databases For Aviation Applications; Digital Avionics Systems Conference Proceedings; Indianapolis, IN Oct. 2003.

Theunissen E. et al.; Design and Evaluation of Taxi Navigation Displays; Digital Avionics Systems Conference Proceedings; New York, NY Oct. 2002.

* cited by examiner

AIRPORT RUNWAY COLLISION AVOIDANCE SYSTEM AND METHOD

BACKGROUND OF THE INVENTION

In the early years of aviation, all flight operations were conducted in visual meteorological conditions (VMC) since safe operation of an aircraft was only possible with reference to visual cues such as a visual horizon and geographical terrain. In subsequent years, various ground-based electronic navigational aids and aircraft cockpit instrumentation systems were developed that cooperatively permitted navigation in instrument meteorological conditions (IMC). Accordingly, it was possible to perform enroute navigation when the aircraft is above or within cloud layers where familiar visual references are absent. Somewhat later, ground-based systems, aircraft instrumentation and landing procedures were developed that permitted a suitably equipped aircraft to land at a suitably configured airport when the conditions at the airport would not allow operations by visual reference alone. For example, non-precision approach procedures are commonly available at many airports so that the aircraft may safely land under IMC with reference to a ground-based navigational aid such as a non-directional beacon (NDB) or a very high frequency omnirange (VOR) installation. In addition, precision approach procedures are commonly available at larger airports to permit higher volumes of traffic into the airport to be conveniently accommodated in IMC. For example, the well-known instrument landing system (ILS) permits a suitably equipped aircraft to controllably approach and descend to an airport runway by providing the aircraft with localizer information that assists the aircraft with lateral course guidance, and with glide slope information that permits the aircraft to controllably descend to the airport runway.

In general, ILS ground-based systems, aircraft instrumentation and landing procedures are organized into ILS Categories that characterize the airport conditions that the ILS system will support. Briefly and in general terms, the various ILS Categories each provide a decision height (DH), and a runway visual range (RVR). The DH specifies how close to the runway a pilot may descend while attempting to visually detect the runway, while the RVR describes the visual range the pilot may expect at the selected airport. Accordingly, before executing the ILS approach or before attempting to land, the pilot must verify that the airport RVR is currently equal to or greater than the minimum RVR as provided in the ILS procedure. If the RVR condition is satisfied, the ILS approach may be attempted, and the pilot is expected to observe the runway, and/or a runway lighting system when the aircraft reaches the DH. Otherwise, the pilot must abort the landing and execute a "missed approach" in conformity with the procedure. Currently, ILS Category I provides for approaches having a DH of not less than 200 feet, and an RVR of not less than 1,800 feet, while ILS Category II permits approaches to a DH of not less than 100 feet, with an RVR of not less than 1,200 feet. Still other ILS Categories provide for even lower minimum requirements. Example, ILS Category III generally provides no DH minimum, and an RVR of not less than 700 feet for Category IIIa; an RVR of not less than 150 feet for Category IIIb; and approaches without an RVR minimum for Category IIIc.

Accordingly, during airport operations in low visibility, the entire runway length is generally not visible to the pilot, so that the pilot is precluded from visually observing that other aircraft are not present on the runway, or approaching the runway. At airports where aircraft moving about the airport on taxiways adjacent to runway are under the control of a ground controller positioned in an airport control tower, the ground controller is limited to visual observations of the aircraft moving about the airport. Consequently, the ground controller must generally assume that aircraft are moving in compliance with the instructions issued by the controller, and rely on position reports from aircraft as they maneuver about the airport. The position reports are also available to other aircraft that are moving on the airport since a common radio frequency is used. Airports without ground controllers rely exclusively on pilots of taxing aircraft knowing where they are at all times.

Ground surveillance radar systems are available at selected airports to assist ground controllers when the airport visibility is limited. Images obtained by the ground surveillance radar system permit individual aircraft to be identified and further permits the movement of the aircraft to be tracked by the ground controller in real time. Although ground surveillance radar system constitutes an improvement in the state of the art, they are generally costly systems, and consequently, are available at relatively few airports. Furthermore, ground surveillance radar systems require the presence of a ground controller, who may not be present during selected hours unless the airport control tower is continuously maintained. Accordingly, the ground surveillance radar system, if present, may not be available when visibility conditions are poor due to a tower closure. Moreover, even if the radar system is present and continuously monitored by a ground controller, the controller may still issue erroneous instructions to a flight crew, or the flight crew may not properly comprehend proper instructions, which may contribute to an aircraft collision.

Therefore, due to the complexity of many airports, and further in view of the increasing traffic activity present at many airports, the possibility of operational errors is significantly increased during periods of low visibility. In particular, the possibility of a runway incursion by an unauthorized aircraft due to a missed position report or a communications error is significantly enhanced.

What is needed in the art is a system and a method that permits an aircraft to readily inform other aircraft that the aircraft is on the runway. Furthermore, the system and method should also permit the aircraft occupying the runway to communicate with aircraft executing a landing approach.

SUMMARY OF THE INVENTION

The present invention includes a system and method for avoiding runway collisions. In an aspect of the invention, a collision avoidance system includes a position-sensing device that is operable to determine a position of the aircraft, and a communications system operable to support two-way communications between the aircraft and other similarly configured aircraft. A collision avoidance processor is coupled to the position-sensing device and the communications system that is configured to generate a message if the aircraft moves into a restricted zone positioned proximate to the airport.

BRIEF DESCRIPTION OF THE DRAWINGS

The preferred and alternative embodiments of the present invention are described in detail below with reference to the following drawings.

DETAILED DESCRIPTION OF THE INVENTION

Many specific details of certain embodiments of the invention are set forth in the following description and in FIGS. 1 through 3 to provide a thorough understanding of such embodiments. One skilled in the art, however, will understand that the present invention may have additional embodiments, or that the present invention may be practiced without several of the details described in the following description.

Figure 1:
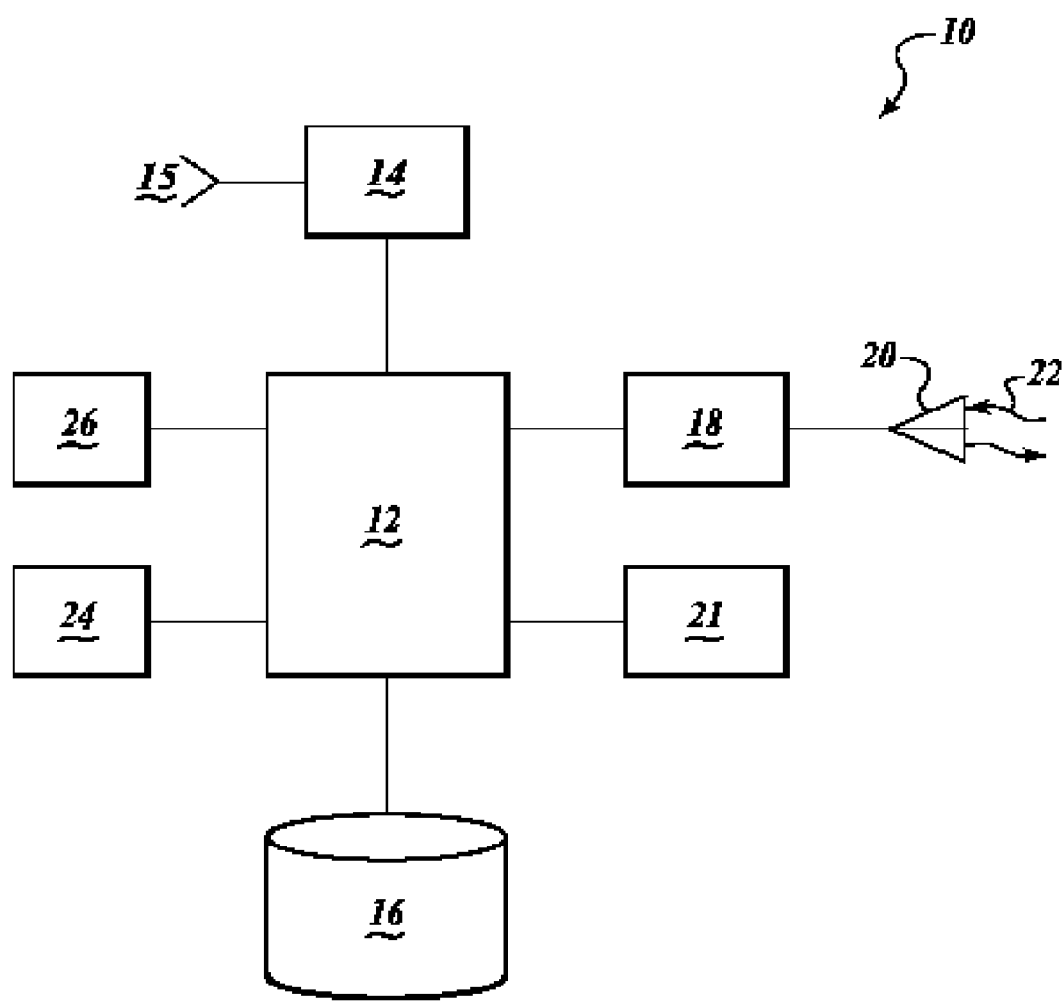
FIG. 1 is a block diagrammatic view of an aircraft collision avoidance system according to an embodiment of the invention.

FIG. 1 is a block diagrammatic view of an aircraft collision avoidance system 10 according to an embodiment of the invention. The system 10 includes a collision avoidance processor 12 operable to receive positional information from a position-sensing device 14. The position-sensing device 14 may be a portion of an inertial navigation system (INS) installed in an aircraft, or it may be a global positioning system (GPS) receiver that is installed in the aircraft. In either case, the position-sensing device 14 is configured to accurately provide the position of the aircraft relative to a fixed system of coordinates, such as the familiar latitude and longitude coordinates, or other similar Cartesian coordinate systems. The position-sensing device 14 may also receive navigational and/or flight plan data 15 from a flight management computer (FMC) system installed in the aircraft. The system 10 further includes a database 16 that includes information that describes runways and taxiways for a selected airport, and also includes approach information for the selected airport. For example, the database 16 may include the direction of runways at the selected airport, the location of taxiways adjacent to the runways, and may also include the location of runway exits that connect a selected runway to a taxiway. Moreover, the database 16 may also include the locations of various hold locations on the taxiways or runway exits, as will be described in greater detail below. The database 16 may also include approach information that may include data pertaining to non-precision and precision approaches. For example, the database 16 may include data for NDB or VOR non-precision approaches, and may also include DH and RVR information for Category I, II and III ILS approaches.

The system 10 also includes a transceiver 18 that is coupled to an antenna 20 positioned on an exterior portion of the aircraft. The transceiver 18 is operable to transmit and receive signals 22 at a selected wavelength while the aircraft is within a predetermined range of the airport. In one particular embodiment, the transceiver 18 is configured to radiate at power levels that are sufficient to transfer the signals 22 approximately about eight to ten miles, so that the signals 22 may be communicated between an aircraft on approach that is approximately positioned at the outer marker (OM) on an ILS approach, and an aircraft on the ground. The transceiver 18 may be configured to operate at VHF wavelengths, UHF wavelengths, or at microwave frequency (MF) wavelengths. The transceiver 18 may include one of the VHF transceivers commonly installed in an aircraft for communications purposes. Alternately, the transceiver 18 may be a unit that is separate from the VHF communications transceivers. The antenna 20 is positioned on a portion of the aircraft that allows approximately omnidirectional coverage, so that the signals 22 may be readily transmitted and received by other aircraft located at the airport. In an alternate embodiment, the system 10 may include more than a single antenna positioned on an exterior portion of the aircraft.

The collision avoidance processor 12 is also coupled to an air-ground logic device 24 that is operable to detect whether the aircraft is positioned on the ground, or if the aircraft is in flight. Accordingly, the air-ground logic device 24 may include an air-ground logic system commonly installed on commercial aircraft, such as an air-ground logic system configured to detect the presence of a load on a landing gear portion of the aircraft. Alternately, the air-ground logic device 24 may include other systems commonly installed on commercial aircraft, such as a radio altimeter system operable to determine an absolute altitude of the aircraft. The collision avoidance processor 12 is also coupled to a crew warning system 26 operable to visually and/or aurally transfer alarm signals generated by the processor 12 to a flight crew in the aircraft. Accordingly, the crew warning system 26 may be a separate system that is dedicated to transfer the alarm signals generated to the flight crew. Alternately, the crew warning system 26 may include at least a portion of an existing aircraft system, such as the well-known engine indication and crew alerting system (EICAS) commonly employed on commercial aircraft. In another embodiment, the crew warning system 26 may include at least a portion of a ground proximity warning system (GPWS) also commonly employed on commercial aircraft. In either case, audible signals may be generated by the crew warning system 26 that communicate verbal warnings or advisory messages to the flight crew by means of a voice synthesizer. Alternately, the audible signals may include continuous and/or intermittent audible tones that are associated with warning levels or advisory messages. Additionally, the crew warning system 26 may also visually present warning levels or advisory messages to the flight crew by means of warning lights and/or a visual display device operable to visually present graphical and/or alphanumeric data to the flight crew.

The system 10 also includes an altitude-sensing device 21 that is coupled to the processor 12 that is operable to determine the altitude of the aircraft. Accordingly, the altitude-sensing device 21 may receive altitude information from an air-data system commonly installed in commercial aircraft. The air-data system is configured to determine an altitude of the aircraft based upon static air pressure measurements. Alternately, the altitude-sensing device 21 may receive altitude information from a radio altimeter system installed in the aircraft.

Still referring to FIG. 1, the collision avoidance processor 12 will now be described in detail. The processor 12 generally includes any programmable electronic device configured to receive programming instructions and input data, and to process the data according to the programming instructions. The processor 12 may be further coupled to a plurality of external devices (not shown in FIG. 1), including a pointing device operable to provide input commands to the processor 12, a keyboard for the entry of text information and commands to the processor 12, and a viewing screen for viewing information generated by the processor 12. Other external devices that may be coupled to the processor 12 include a printer operable to generate a printed copy of information generated by the processor 12, and a communications port that may be used to couple other processors and/or input and output devices to the processor 12 through a communications network. A storage device configured to receive a removable data storage medium, such as a magnetic disk, an optical disk, a tape device or other similar storage devices may also be coupled to the processor 12 so that information may be transferred to and from the processor 12.

The collision avoidance processor 12 receives positional information from the position-sensing device 14. The positional information may be used to determine the identity of the airport since the processor 12 initiates a search of the database 16 based upon the sensed location. Once the airport has been identified, the positional information may be used to determine the position of the aircraft on the identified airport. The processor 12 further receives information from the air-ground logic device 24 to determine if the aircraft is in flight or on the ground. When the aircraft is on the ground, the processor 12 instructs the transceiver 18 to operate in a receive mode if the processor 12 determines that the aircraft is positioned off an active runway, and to operate in both a receive and transmit mode when the processor 12 determines that the aircraft is in flight or on the runway. Accordingly, the aircraft may indicate its presence on an active runway by emitting signals that are received by other similarly configured aircraft at the identified airport. In addition, if the aircraft is in flight and is within a predetermined distance of the airport, such as on an approach to the active runway, the aircraft similarly indicates to other similarly configured aircraft at the airport that the approaching aircraft is about to land on the active runway. The processor 12 may determine that the aircraft is in the approach structure by receiving altitude information from the altitude-sensing device 21. In selected embodiments, various audible indications such as tones having a prescribed frequency, or intermittent tones that conform to a prescribed audible pattern may be used. In other particular embodiments, audible indications may be generated by a voice synthesizer device that is configured to generate audible warnings having a selected verbal content. For example, one audible warning may include "Traffic on runway" to indicate that an aircraft is presently on the ground and on the indicated runway. If the aircraft is airborne, the audible warning may include "Traffic on approach" or other similar verbal messages having similar content.

Since the aircraft transmits and receives when the aircraft is on the active runway, if two or more similarly configured aircraft are positioned on the runway at the same time, the aircraft may mutually receive indications that more than a single aircraft is on the active runway. If such a situation occurs, collision avoidance processor 12 could alert pilots of the two aircraft on the runway that one airplane has taxied in front of another aircraft that is taking off. Each aircraft detects if they are in a takeoff mode by analyzing various systems, such as engine thrust readings and/or groundspeed/airspeed. The takeoff mode information may be included in the transmitted signal.

Figure 2:
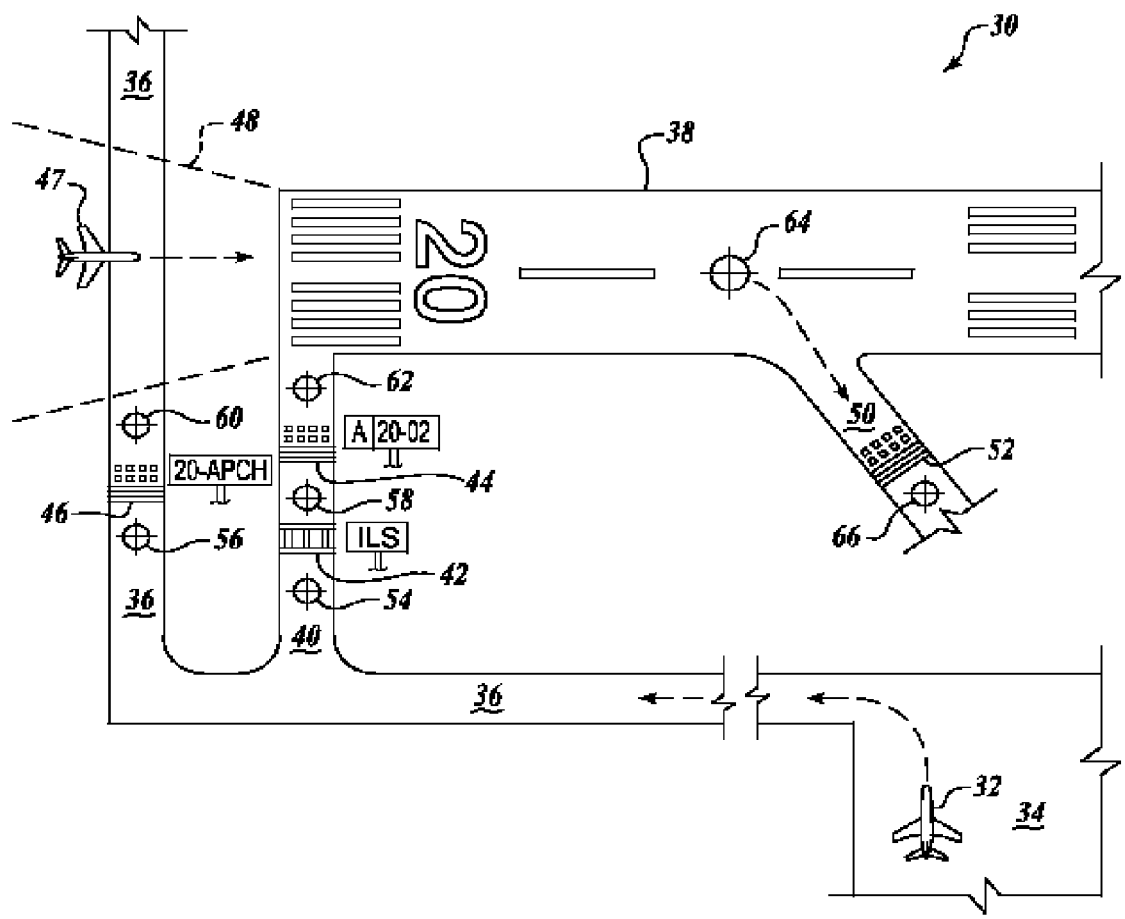
FIG. 2 is a plan view of a portion of an airport that will be used to further describe the operation of the system of FIG. 1.

FIG. 2 is a plan view of a portion of an airport 30 that will be used to further describe the operation of the system 10 of FIG. 1. When an aircraft 32 that includes the system 10 is positioned in a parking area 34, the processor 12 determines the identity of the airport based upon positional information obtained from the positions-sensing device 14 and airport information stored in the database 16. Since the airport information in the database 16 includes the runway and taxiway configurations for the identified airport, and further since the positional information of the aircraft 32 may be continuously updated, the processor 12 may continuously determine a location of the aircraft 32 as it moves onto and along a taxiway 36 adjacent to the parking area 34. Since the aircraft 32 is on the ground and not on the runway, the transceiver 18 is in the receive mode only, so that it may receive signals from other similarly configured aircraft. The aircraft 32 may progressively move towards an active runway 38 along the taxiway 36 and turn inwardly towards the runway 38 and onto a runway entrance 40 that connects the taxiway 36 to the runway 38. The runway entrance 40 may include various visual limitations that limit the further movement of the aircraft 32 towards the runway 38 unless the aircraft 32 is cleared to move onto the runway 38. The visual limitations may include an ILS hold line 42 and a hold short line 44. The ILS hold line 42 is suitably positioned to prevent the aircraft 32 from interfering with the ILS guidance information that is communicated to an aircraft 47 that is executing an ILS approach, while the hold short line 44 is positioned to assure that the aircraft 47 landing on the runway 38 does not physically interfere with the aircraft 32 that is positioned at the hold short line 44. The taxiway 36 may also include a hold short approach line 46 that visually limits the movement of the aircraft 32 into an approach zone 48 while the aircraft 47 is on approach to the runway 38. A runway exit 50 may also connect the runway 38 to the taxiway 36 and/or parking area 34. Accordingly, the exit 50 also generally includes an exit hold line 52 that indicates a boundary of the runway area.

With reference still to FIG. 2, the aircraft 32 may move to a position 54 on the runway entrance 40, or alternately, a position 56 on the taxiway 36. When the aircraft 32 is positioned in either the first position 54 or the second position 56, the aircraft 32 remains clear of the runway 38 and the approach zone 48, which collectively include a restricted zone that may be occupied by only a single aircraft at a time. The collision avoidance system 10 (FIG. 1) in aircraft 32 thus remains in a receive only mode, so that transmissions from a similarly equipped aircraft may be monitored. Accordingly, the aircraft 32 receives the signals 22 from the aircraft 47 to inform the crew of the aircraft 32 that the aircraft 47 is approaching the runway 38. The signals 22 may specifically indicate that the aircraft 47 is on approach to the runway 38, since the air-ground logic device 24 of the system 10 (FIG. 1) present in the aircraft 47 indicates to the processor 12 that the aircraft 47 is still in flight.

When the aircraft 32 moves to a position 58 that is beyond the ILS hold line 42, or if the aircraft 32 moves beyond the hold short approach line 46 to a position 60, the system 10 on the aircraft 32 moves to the receive and transmit mode, so that the aircraft 47 that is approaching the runway 38 may receive signals 22 from the aircraft 32. The signals 22 that are emitted by the aircraft 32 may be merely advisory, so that the crew of the aircraft 47 is informed that the guidance information from the ILS may be affected, or otherwise inform the crew of the aircraft 47 that the aircraft 32 has moved into the approach zone 48. As a consequence, the crew aboard the aircraft 47 may optionally continue the approach, or abort the approach and execute the missed approach procedure for the runway 38. Alternately, the signals 22 may include an alert level that may require the aircraft 47 to abort the approach and execute the missed approach procedure for the runway 38. If the aircraft 32 moves to a position 62 while the aircraft 47 is approaching the runway 38, a runway incursion has occurred, and the signals 22 include an alert level requiring the aircraft 47 to abort the approach and execute the missed approach procedure.

If the aircraft 32 remains at the position 54 or the position 56, the aircraft 47 continues the approach and lands on the runway 38. When the aircraft is on the runway 38 at a position 64, the air-ground logic device 24 of the system 10 in the aircraft 47 indicates to the processor 12 that the aircraft 47 is on the ground. Accordingly, the signals 22 may specifically indicate that the aircraft 47 is on the runway 38. When the aircraft 47 moves onto the runway exit 50, and beyond the exit hold line 52 (point 66), the system 10 installed in the aircraft 47 changes from the receive and transmit mode to the receive mode only.

Although the foregoing description refers to the aircraft 47 on an ILS approach to the runway 38, it is understood that the aircraft 47 may be executing other types of precision and non-precision approaches. For example, the aircraft 47 may be executing a microwave landing system (MLS) approach. Alternately, the aircraft 47 may be executing a non-precision approach that positions the aircraft 47 off a centerline of the runway 38 until the aircraft 47 is on a final approach segment of the non-precision approach. Similarly, the aircraft 47 may execute non-precision approaches according to circle-to-land minimums that are generally higher minimums than those ordinarily specified in the non-precision approach. Although the circle-to-land minimums provide for adequate obstruction clearance, the aircraft 47 is generally positioned above and around the active runway 38 at a circle-to-land minimum altitude until the aircraft 47 is in a position to approach the runway 38. Accordingly, the approach zone 48 may include regions above and adjacent to the runway 38.

The aircraft collision avoidance system 10 of FIG. 1 is preferably actuated automatically so that aircraft equipped with the system 10 may exchange signals without intervention from a flight crew of the aircraft. The system 10 may be actuated when the processor 12 determines that the aircraft is within a predetermined distance of an airport where the aircraft intends to land. Accordingly, when the processor 12 determines that the aircraft has entered a selected approach structure by receiving altitude information from the altitude-sensing device 21 and positional information from the position-sensing device 14, the system 10 is actuated. The system 10 may also be actuated when an auto-land feature is selected in an autopilot system during an ILS Category II or Category III approach. Alternately, the system 10 may be actuated when the position-sensing device 14 receives data 15 from the FMC that indicates that the aircraft is commencing an approach to the airport.

Figure 3:
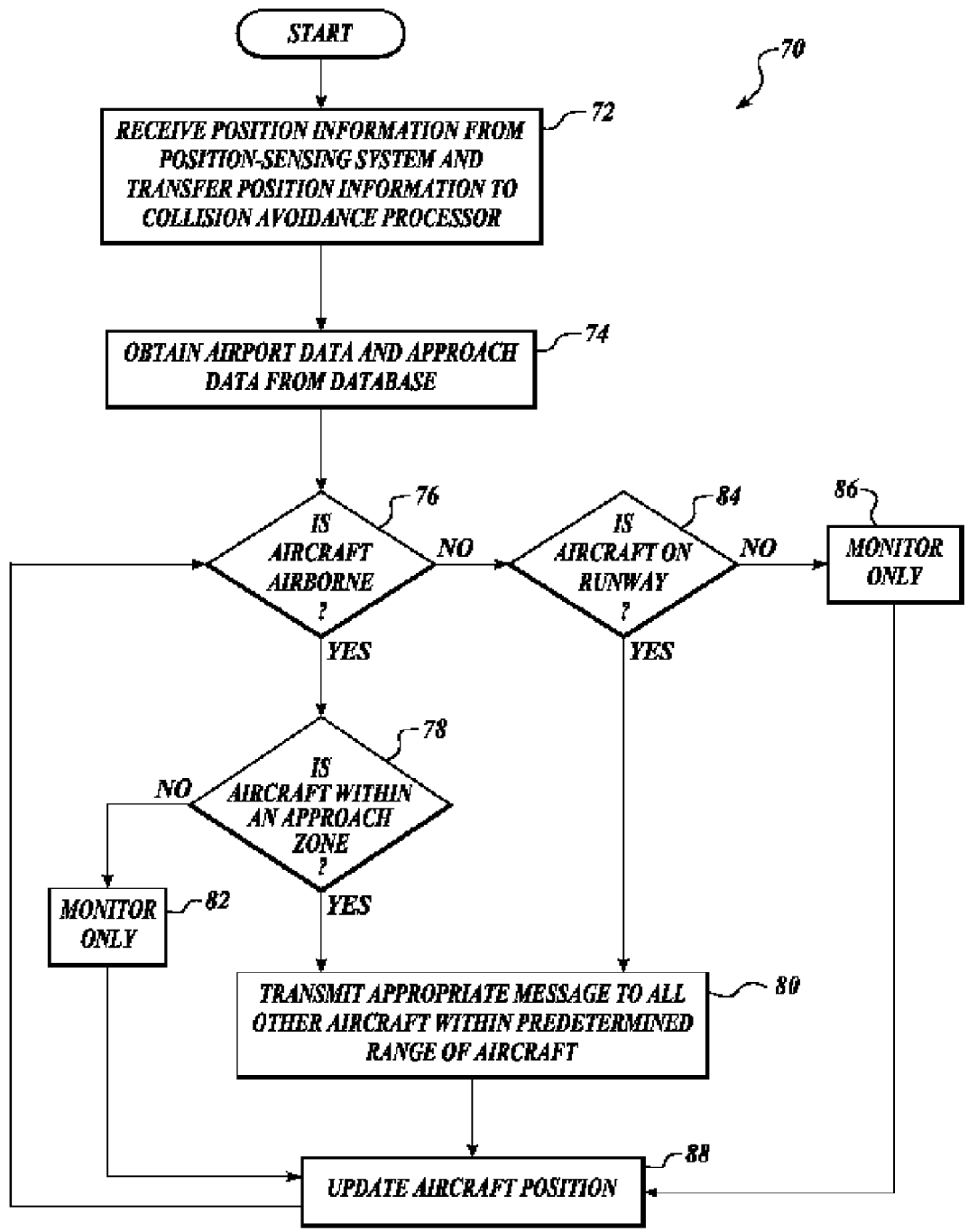
FIG. 3 is a flowchart that illustrates a method of collision avoidance for an aircraft according to another embodiment of the invention.

FIG. 3 is a flowchart that illustrates a method of collision avoidance 70 for an aircraft according to another embodiment of the invention. Referring also again to FIG. 1, at block 72, the position-sensing device 14 determines a position for the aircraft. In one particular embodiment, the system 10 is not activated unless the aircraft is within a predetermined range of an airport selected for landing. Accordingly, the aircraft may determine the range by interrogating the position sensing device 14 and the altitude-sensing device 21. If the aircraft is within the predetermined range, the position information may be transferred to the collision avoidance processor 12. At block 74, the collision avoidance processor 12 obtains airport and/or approach information from the database 16. At block 76, the system 10 determines if the aircraft is airborne by interrogating the air-ground logic device 24. If the aircraft is determined to be airborne, the processor 12 determines whether the aircraft is within the approach zone 48, as shown at block 78. If the aircraft is within the approach zone 48, the processor 12 generates an appropriate message and transmits the message to other aircraft through the transceiver 18, as shown at block 80. The aircraft within the approach zone 48 is also operating in receive mode. Otherwise, the aircraft monitors the selected ground frequency for transmissions from other similarly configured aircraft, as shown at block 82.

Referring again to block 76, if the aircraft is not airborne, at block 84 the processor 12 determines whether the aircraft is on the active runway or, in another embodiment, within a threshold distance from the active runway. If the aircraft is not on the runway, the aircraft monitors the selected frequency for transmissions from other similarly configured aircraft, as shown at block 86. Otherwise, at block 80, the processor 12 generates an appropriate message and transmits the message to other aircraft through the transceiver 18. Since the aircraft is in motion if airborne, and may be in motion if the aircraft is on the ground, the method 70 is configured to periodically update the position of the aircraft, as shown in block 88.

In another embodiment, the database 16 also includes "boxes" or "envelopes" within which an aircraft would be considered to be in a conflict area (on ground or on approach).

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A collision avoidance system for an aircraft, the system comprising:
    a position-sensing device operable to determine a position of the aircraft;
    a communications system operable to support two-way communications between the aircraft and other aircraft; and
    a collision avoidance processor in communication with the position-sensing device and the communications system, the processor being configured to generate an advisory signal if the aircraft is determined to be positioned in a predefined first restricted zone positioned proximate to an airport runway and transmit the generated advisory signal to other similarly configured aircraft via the communications system thereby informing the other aircraft that a current instrument landing system (ILS) landing process may be affected,
    wherein the generated signal includes the determined positional information for the aircraft,
    wherein the collision avoidance processor receives signals emitted from another aircraft configured to emit signals when the other aircraft is positioned in a second restricted zone, wherein the transmitted signals include the determined positional information for the other aircraft, the collision avoidance processor compares positional information for the other aircraft to the determined positional information for the aircraft, determines if a collision hazard exists based on the comparison, and outputs an alert if it is determined that a collision hazard exists, the determined position information includes previously stored airport information, and the airport information includes at least one of runway information, taxiway information and approach to landing information.

2. The system of claim 1, wherein the position-sensing device comprises a global positioning system (GPS) receiver.

3. The system of claim 2, wherein the position-sensing device is configured to receive navigational and flight plan data is from a flight management computer (FMC).

4. The system of claim 1, wherein the position-sensing device comprises an altitude-sensing device.

5. The system of claim 4, wherein the altitude-sensing device comprises at least one of a pitot-static system and a radio altimeter system.

6. The system of claim 1, further comprising an air-ground logic device coupled with the collision avoidance processor, the air-ground logic device being configured to determine an air-ground state for the aircraft.

7. The system of claim 6, wherein the air-ground logic device comprises at least one of an air-ground logic system that is coupled to a landing gear system of the aircraft, and a radio altimeter system.

8. A method of collision avoidance for an aircraft, the method comprising determining position information for the aircraft;

determining if the aircraft is within a first restricted zone proximate to an airport runway based on the position information for the aircraft;

if the aircraft is determined to be within the first restricted zone, transmitting an advisory signal to at least one other aircraft approaching for landing during an instrument landing system (ILS) landing process on the airport runway thereby informing the other aircraft that a current ILS landing process may be affected; and monitoring for signals emitted from the other aircraft configured to emit signals when positioned in a second restricted zone, wherein the transmitted signals include the determined position information for the aircraft, wherein the collision avoidance processor receives signals emitted from the other aircraft configured to emit signals when the other aircraft is positioned in the second restricted zone, wherein the transmitted signals include the determined positional information for the aircraft and the received signals include the determined positional information for the other aircraft, the collision avoidance processor compares positional information for the other aircraft to the determined positional information for the aircraft, determines if a collision hazard exists based on the comparison, and outputs an alert if it is determined that a collision hazard exists, the determined position information includes previously stored airport information, and the airport information includes at least one of runway information, taxiway information and approach to landing information.

9. The method of claim 8, wherein determining position information further comprises receiving position information from a global positioning system (GPS).

10. The method of claim 8, wherein determining position information further comprises periodically updating the position of the aircraft relative to the airport area.

11. The method of claim 8, wherein determining position information further comprises determining an altitude for the aircraft.

12. The method of claim 8, wherein determining if the aircraft is within a restricted zone further comprises detecting if the aircraft is moved across one of a hold short line, a hold short approach line and an ILS hold line adjacent to a runway.

13. The method of claim 8, wherein determining if the aircraft is within a restricted zone further comprises detecting if the aircraft enters an approach zone proximate to the airport.

14. The method of claim 8, wherein determining if the aircraft is within a restricted zone further comprises detecting if the aircraft is on the ground.

15. The method of claim 8, wherein monitoring for signals comprises generating an audible warning message if a signal emitted from another vehicle is received.

16. The method of claim 8, wherein monitoring for signals comprises generating a visual warning message if a signal emitted from another vehicle is received.

17. The system of claim 1, wherein the collision avoidance processor is further configured to generate a landing abort signal if the aircraft is determined to be positioned in a predefined third restricted zone positioned proximate to the airport runway and configured to transmit the generated landing abort signal to the other aircraft so the other aircraft is informed that a current landing process should be aborted.

18. The system of claim 1, wherein the second restricted zone corresponds to a portion of the airport runway on which the other aircraft has landed.

19. The system of claim 1, wherein the aircraft in taxing to the airport runway when in the first restricted zone, and wherein the first restricted zone is an approach zone of the airport runway.

20. The method of claim 8, further comprising:

determining if the aircraft is within a third restricted zone proximate to an airport runway based on the position information for the aircraft; and if the aircraft is determined to be within the third restricted zone, transmitting a landing abort signal to the other aircraft approaching for landing on the airport runway so the other aircraft is informed that a current landing process should be aborted.

* * * * *